United States Patent
Bregstein et al.

(10) Patent No.: US 7,966,238 B2
(45) Date of Patent: Jun. 21, 2011

(54) MULTI-LEVEL LEVERAGE ACCOUNT STRUCTURE

(75) Inventors: Henry Bregstein, Tenafly, NJ (US); Renatus R. Van Kesteren, New York, NY (US); Mark Willis, Staten Island, NY (US)

(73) Assignee: Bank of America Corporation, Charlotte, NC (US)

( * ) Notice: Subject to any disclaimer, the term of this patent is extended or adjusted under 35 U.S.C. 154(b) by 16 days.

(21) Appl. No.: 12/565,502

(22) Filed: Sep. 23, 2009

(65) Prior Publication Data
US 2010/0169236 A1 Jul. 1, 2010

Related U.S. Application Data

(63) Continuation of application No. 11/474,579, filed on Jun. 26, 2006, now abandoned.

(51) Int. Cl.
*G06Q 40/00* (2006.01)
(52) U.S. Cl. ........................................................ 705/35
(58) Field of Classification Search ........................ None
See application file for complete search history.

(56) References Cited

U.S. PATENT DOCUMENTS

| | | | | |
|---|---|---|---|---|
| 4,910,676 A | * | 3/1990 | Alldredge | 705/37 |
| 5,812,987 A | | 9/1998 | Luskin et al. | 705/36 |
| 5,983,206 A | * | 11/1999 | Oppenheimer | 705/38 |
| 6,021,943 A | * | 2/2000 | Chastain | 235/379 |
| 6,108,641 A | * | 8/2000 | Kenna et al. | 705/35 |
| 7,089,205 B1 | * | 8/2006 | Abernethy | 705/37 |
| 7,133,840 B1 | * | 11/2006 | Kenna et al. | 705/35 |
| 7,349,881 B1 | * | 3/2008 | Lockwood | 705/37 |
| 7,574,403 B2 | * | 8/2009 | Webb et al. | 705/39 |
| 7,657,478 B2 | * | 2/2010 | De Diego Arozamena et al. | 705/36 R |

(Continued)

OTHER PUBLICATIONS

Buscema, John; Master-Feeder Funds: Structuring for Maximum Efficiency; May 11, 2006.*

(Continued)

*Primary Examiner* — Hani Kazimi
*Assistant Examiner* — Virpi H Kanervo
(74) *Attorney, Agent, or Firm* — Michael Springs

(57) ABSTRACT

An investment structure for multiple classes of investors that combines the advantages of both the master feeder structure and the reverse master feeder structure with segregated accounts. In particular, an investment structure is formed in which investors invest in a common fund. The common fund, in turn, opens a common prime brokerage account, having at least three sub-accounts, for example: an unlevered account; one or more levered accounts and a general trading account. The prime broker provides class loans to the levered account and margin loans to the general trading account. To the extent class loans are provided to the levered account, levered investors will participate in the returns on the general account as if the levered investors invested capital plus the amount of any class loans to that levered account. The unlevered investors will participate in the returns on the general trading account on the basis of their capital contributions alone. The prime broker will have no recourse against any assets of any account other than the levered account as a result of a default or margin call of the levered account. In an alternative embodiment of the invention, the investment structure is structured as a fund of funds, in which multiple classes of investors invest, which, in turn, invests in multiple investment funds, or a fund that employs alternative investment strategies that overlay the basic trading strategies. In this embodiment, a credit facility is established with the equivalent of three sub-accounts as discussed above.

12 Claims, 6 Drawing Sheets

U.S. PATENT DOCUMENTS

| | | | |
|---|---|---|---|
| 2004/0054613 A1* | 3/2004 | Dokken | 705/36 |
| 2004/0107157 A1* | 6/2004 | Bleunven et al. | 705/37 |
| 2004/0243498 A1* | 12/2004 | Duke | 705/35 |
| 2006/0015426 A1* | 1/2006 | Freund | 705/35 |
| 2006/0059074 A1 | 3/2006 | Freund | 705/35 |
| 2006/0064378 A1* | 3/2006 | Clementz et al. | 705/40 |
| 2006/0080148 A1* | 4/2006 | Koresko | 705/2 |
| 2006/0224494 A1 | 10/2006 | Pinkava | 705/37 |
| 2006/0235785 A1* | 10/2006 | Chait et al. | 705/37 |
| 2006/0242041 A1* | 10/2006 | Canney | 705/35 |
| 2006/0271453 A1 | 11/2006 | Landle et al. | 705/35 |
| 2006/0277124 A1 | 12/2006 | Gerrietts, II | 705/35 |
| 2007/0040015 A1* | 2/2007 | Carlson et al. | 235/379 |
| 2007/0118449 A1 | 5/2007 | De La Motte | 705/35 |
| 2007/0136180 A1 | 6/2007 | Salomon et al. | 705/37 |
| 2007/0150413 A1 | 6/2007 | Morgenstern | 705/39 |
| 2008/0065532 A1* | 3/2008 | De La Motte | 705/39 |
| 2008/0097884 A1 | 4/2008 | Ferris | 705/36 R |

OTHER PUBLICATIONS

Anonymous; Journal of Accountancy; vol. 197, No. 3, pp. 86-95; Mar. 2004.*

Anonymous; Internal Revenue Bulletin; No. 2002-1, pp. 117-126; Jan. 7, 2002.*

Burton, Hughlene; Tax Adviser; vol. 33, No. 2, pp. 108-116; Feb. 2002.*

Al Hudec, et al.; *Offshore Hedge Funds*; Davis & Company; VanSOL:647358.1; 22 pages.

BankersOnline.com; *Regulation T*; 1 page.

Green Trader Law; *Hedge Funds; Funds Types & Offerings: Master Feed Funds*; 1 page.

Investopedia.com; *Margin Call*; 1 page.

Wikipedia; *Margin (finance)*; 5 pages.

Coudert Brothers LLP; *Organization of Off-Shore Investment Funds*; 11 pages, Feb. 15, 1999.

Nandita Das, et al.; *An Overview of the Hedge Fund Industry*; 33 pages, 2002.

HedgeFund.Net; *Hedge Fund Primer; New to Hedge Funds?*; 2 pages, Retrieved May 11, 2006.

Jonathan P. Blum; *Bank Credit and Hedge Funds*; 4 pages, Retrieved May 11, 2006.

John Buscema; *Master-Feeder Funds: Structuring for Maximum Efficiency*; 4 pages, Retrieved May 11, 2006.

Hannah M. Terhue; *Hedge Funds; Partnership Tax Issues of Offshore Hedge Funds*; 4 pages, Retrieved May 11, 2006.

www.HFAlert.com; *Hedge Fund Alert*; 15 pages, Retrieved May 11, 2006.

Hedge Fund World.com; *Description of a Hedge Fund*; 9 pages, Retrieved May 11, 2006.

USPTO; *Office Action* for U.S. Appl. No. 11/474,579, filed Jun. 26, 2006 in the name of Henry Bregstein; 21 pages, Apr. 22, 2008.

*International Search Report* for International Application No. PCT/US07/72108; 1 page, Jul. 30, 2008.

USPTO; *Office Action* for U.S. Appl. No. 11/474,579, filed Jun. 26, 2006 in the name of Henry Bregstein; 24 pages, Mar. 24, 2009.

* cited by examiner

*FIG. 4A*

Initial Class Loan LTV 50.00%
Max Class Loan LTV 50.00%
Minimum Equity Requirement 10.00%
(= 1-Maximum LTV) ^

A  BEGINNING OF PERIOD                                  Pro rata  33.33%

General Account=>  350.00 Assets    200.00 Margin Loan
                                       0.00 Equity = Gain/Loss
                                     100.00 Unlevered
                                      25.00 Levered - Equity
                                      25.00 Levered - Class Loan
                                     350.00

B  END OF PERIOD (MONTH, FOR EXAMPLE)  Assets Value Chg -15%
                                                            Pro rata  33.33%

General Account=>  297.50 Assets    200.00 Margin Loan
                                     -52.50 Equity = Gain/Loss
                                     100.00 Unlevered
                                      25.00 Levered - Equity
                                      25.00 Levered - Class Loan
                                     297.50

B.1  CLASS LOAN REBALANCE

Portfolio LTV    67.23%  = Margin Loan/Assets
   Leveraged Account Equity   7.50
    Change in Class Loan    -17.50
         Change in Assets   -53.40
                                                            Pro rata  18.75%

General Account=>  244.10 Assets    164.10 Margin Loan
                                       0.00 Equity = Gain/Loss
                                      65.00 Unlevered
                                       7.50 Levered - Equity
                                       7.50 Levered - Class Loan
                                     244.10

B.2  2xL CLASS-NET SUBSCRIPTION (REDEMPTION)   (4.00)

Portfolio LTV    67.23%  = Margin Loan/Assets
           Class Loan LTV   50.00%
  Portfolio + Class Loan LTV  83.61%  = (Margin Loan + Class Loan/Pro Rata)/Assets
         Change in Assets   (24.41)  = Redemption/(1-Portfolio + Class Loan LTV)
                                                            Pro rata  9.72%

General Account=>  219.69 Assets    147.69 Margin Loan
                                       0.00 Equity = Gain/Loss
                                      65.00 Unlevered
                                       3.50 Levered - Equity
                                       3.50 Levered - Class Loan
                                     219.69

Class Loan LTV   50.00%
  Portfolio + Class Loan LTV  83.61%

| MARGIN CALL | |
|---|---|
| Margin Requirement | 35.00 |
| + Add Class Loan/Pro Rata | 75.00 |
| Equity Requirement | 110.00 |
| Equity | 150.00 |
| In there a margin call? | |
| | |
| Margin Requirement | 29.75 |
| + Add Class Loan/Pro Rata | 75.00 |
| Equity Requirement | 104.75 |
| Equity | 97.50 |
| In there a margin call? | Margin Call |
| | |
| Margin Requirement | 24.41 |
| + Add Class Loan/Pro Rata | 40.00 |
| Equity Requirement | 64.41 |
| Equity | 80.00 |
| In there a margin call? | |
| | |
| Margin Requirement | 21.97 |
| + Add Class Loan/Pro Rata | 36.00 |
| Equity Requirement | 57.97 |
| Equity | 72.00 |
| In there a margin call? | |
| | |

| SEGREGATION | | | | |
|---|---|---|---|---|
| | | | | |

| SEGREGATION | | | | |
|---|---|---|---|---|
| | Class Loan + Portfolio LTV 77% | | Margin | |
| Levered Account => | 99.17 Assets | 66.67 Margin Loan | | |
| | | 25.00 Class Loan | | |
| | | 7.50 Net Equity | 7.6% | |
| Unlevered Account => | 198.33 Assets | 133.33 Margin Loan | | |
| | | 65.00 Net Equity | 32.8% | |
| | 297.50 | 200.00 | | |
| | | 97.50 | | |

| SEGREGATION | | | | |
|---|---|---|---|---|
| | Class Loan + Portfolio LTV 50% | | Margin | |
| Levered Account => | 45.77 Assets | 30.77 Margin Loan | | |
| | | 7.50 Class Loan | | |
| | | 7.50 Net Equity | 16.4% | (0.00) |
| Unlevered Account => | 198.33 Assets | 133.33 Margin Loan | | |
| | | 65.00 Net Equity | 32.8% | |
| | 244.10 | 164.10 | | |
| | | 80.00 | | |

| SEGREGATION | | | | |
|---|---|---|---|---|
| | Class Loan + Portfolio LTV 50% | | Margin | |
| Levered Account => | 21.36 Assets | 14.36 Margin Loan | | |
| | | 3.50 Class Loan | | |
| | | 3.50 Net Equity | 16.4% | (0.00) |
| Unlevered Account => | 198.33 Assets | 133.33 Margin Loan | | |
| | | 65.00 Net Equity | 32.8% | |
| | 219.69 | 147.69 | | |
| | | 72.00 | | |

MULTI-LEVEL LEVERAGE ACCOUNT STRUCTURE

RELATED APPLICATION

The present application is a continuation of U.S. patent application Ser. No. 11/474,579, entitled "A Multi-Level Leverage Account Structure," filed on Jun. 26, 2006.

FIELD OF THE INVENTION

The present invention relates to an investment fund structure and more particularly to an investment fund structure for multiple classes of investors based upon a managed level of leverage applicable to each class, in which the investment fund opens a prime brokerage account with a prime broker having at least three sub-accounts, for example: one or more Levered Accounts, each of which may provide for a different level of leverage; an Unlevered Account; and a General Trading Account; through which the prime broker provides margin financing through cash advances to the General Trading Account and additional financing by way of class loans to the Leveraged Account and the classes of investors share in the returns on the General Trading Account based on different levels of leverage. The present invention is also applicable to a investment structure in which multiple classes of investors invest in a fund of funds, which, in turn, invests in multiple investment funds, or a fund that employs alternative investment strategies that overlay the basic trading strategies. In such a structure, a credit facility is established with a lender with at least three sub-accounts, as discussed above.

BACKGROUND

Various investment fund structures providing for levered and unlevered accounts are known. In order to manage assets in a single portfolio while increasing the pool of investment assets, master-feeder investment structures are known. In general, master feeder investment structures include multiple feeder funds which invest in a master fund. The master fund, in turn, undertakes trading activity and provides a return to the feeder funds.

In order to increase potential gains on investments, private investment funds may invest on margin. In particular, Federal Reserve Regulations allow such funds to invest their own capital, as well as a certain percentage of borrowed capital typically provided by a prime broker. The prime broker determines the maximum amount of leverage to be provided. This leverage flows through in the return available to an investor in the fund. For example, an unlevered investor investing $100 in a fund with a 10% return would realize a gain of $10. However, an investor investing $100 in fund realizing the same 10% return, but also utilizing an additional $100 of borrowed funds, will realize a gain of $20, less the cost of funds borrowed (i.e., interest charges, fees, legal costs and similar amounts) for a net return that could be significantly greater than 10%. Similarly, losses in a leveraged fund will be greater than those in an unleveraged fund and will be further increased by the cost of funds borrowed.

In order to provide enhanced leverage, investment structures with multiple levels of leverage are known. Such investment structures utilize leverage at two levels: (a) the investor level (i.e., the level at which investors purchase interests in a fund) and (b) the portfolio level (i.e., margin lending). FIGS. 1 and 2 illustrate such investment structures, configured in either a master-feeder structure or as segregated accounts, respectively. Referring first to FIG. 1, a known master-feeder investment structure is illustrated with multiple levels of leverage and generally identified with the reference numeral 20. As shown, the investment structure includes two classes of investors: unlevered investors 22 and levered investors 24 (although this structure also could accommodate multiple classes of levered investors). The investors 22 and 24 invest in separate feeder funds 26 and 28, respectively. The feeder fund 26 is an unlevered feeder fund. For every dollar invested by the unlevered investor 22 in the unlevered feeder fund 26, one dollar is invested into a master fund 30 and the unlevered investor receives one dollar in interests of the master fund 30. On the other hand, the levered investor 28 invests in a levered feeder fund 28, and for every dollar the levered investor 24 invests in the levered feeder fund 28, the levered feeder fund 28 borrows one dollar in the form of a class loan from a lender 32. Thus, for every dollar invested by the levered investor 24, two dollars are invested into the master fund 30, providing leverage at the investor level. In this case, the levered investor receives two dollars in interests or shares of the master fund 30, which are pledged as collateral for the class loan. The collateral is held by a custodian 31. Based on the above scenario, the unlevered investor 22 and the levered investor 24 invest a total of three dollars into the master fund. The funds from the master fund 30 are used to open and maintain a prime brokerage account 34.

In this structure, a second level of leverage is provided at the portfolio level in the form of a margin loan provided by the prime broker to the master fund through the prime brokerage account 34.

There are disadvantages of such an investment structure. In particular, because the only collateral for the class loan is the levered feeder fund's 28 interest in the master fund 30 and such interests are subject to redemption, the lender, such as the lender 32, often requires relatively high interest rates and higher asset coverage (i.e., lower loan to value ratio). The lender 32 also may require a guarantee from the master fund 30 on a pro rata basis based on the ratio of the levered funds to the total funds. Although it may be prudent to require a guarantee, lenders may forego such requirement because of the legal complexity and expense. In addition, the documentation required for this structure is extensive and typically includes (a) a credit agreement between the levered feeder fund 28 and the lender 32, (b) a security agreement between the levered feeder fund 28 and the lender 32, (c) a custody agreement between the levered feeder fund 28 and the custodian, (d) a control agreement between the lender 32, the levered feeder fund 28 and the custodian, (e) a promissory note issued by the levered feeder fund 28 to the lender 32 and the custodian, (f) a guaranty and security agreement between the master fund 30 and the lender 32, (g) an acknowledgment and consent between the master fund 30, the levered feeder fund 28 and the lender 32, (h) a prime brokerage agreement between the master fund 30 and the lender 32, as prime broker and margin leverage provider, and (i) various ancillary agreements between the leveraged feeder fund 28, the lender 32 and various service providers. This extensive documentation results in significant legal expenses that must be incurred to implement the structure.

A second known approach uses a reverse master-feeder investment structure with segregated accounts, for example, as shown in FIG. 2. In this investment structure, both unlevered investors 38 and levered investors 40 invest directly into a common master fund 42. In this example, no leverage is applied at the master fund 42 level. The master fund 42 then invests in segregated reverse feeder funds 44 and 46. One feeder fund 44 is strictly for unlevered funds from the master fund 42 while the second feeder fund 46 is for levered funds from the master fund 46. Each of the feeder funds 44 and 46 opens a separate prime brokerage account 48 and 50. The prime brokerage accounts 48 and 50 are segregated with only one account obtaining additional margin lending. In particular, the prime brokerage account 48 is used for unlevered investors 36 while the prime brokerage account 50 is used for levered investor 40.

In this case, leverage is provided only at the level of the prime brokerage accounts 48 and 50 and thus no collateral is required from the levered investors 40. For each dollar in the prime brokerage account 48, a one dollar margin loan is obtained from the prime broker 52. For each dollar maintained in the prime brokerage account 50, a three dollar margin loan is obtained from the Prime Broker 52.

Although the reverse master-feeder investment structure reduces the costs to the levered investors, there are several disadvantages to such an investment structure. In particular, the portfolio manager must execute two trades for every investment strategy to segregate the levered trading from the unlevered trading. This results in a cumbersome, inefficient means of trading, and more complicated trade reconciliation processes.

In both structures described above, there are ongoing administrative and operational expenses resulting from the need to create and maintain multiple entities to achieve the desired leverage at the investor level. Thus, there is a need for an investment fund that solves the various problems discussed above by providing an investment fund structure with legal, operational and cost efficiency.

SUMMARY OF THE INVENTION

The present invention relates to an investment structure that enables an investment fund to provide leverage at the investor level in addition to leverage at the portfolio level and does so with greater administrative, legal, operational and cost efficiency than known structures. In addition, this structure may offer potentially lower costs of borrowing due to the greater legal certainty related to the structure. In one embodiment of the invention, an investment structure is formed in which investors invest in a common fund having multiple classes. The common fund, in turn, opens a common prime brokerage account, having at least three sub-accounts, for example: one or more Levered Accounts, an Unlevered Account and a General Trading Account. The prime broker provides class loans to the Levered Account and margin loans to the General Trading Account. To the extent class loans are provided to the Levered Account, levered investors will participate in the returns on the General Trading Account as if the levered investors contributed capital plus any class loans made to that Levered Account. The unlevered investors will participate in the returns on the General Trading Account on the basis of their capital contributions alone. The prime broker will contractually agree that it will have no recourse against any assets of any account other than the Levered Account as a result of a default by or margin call against the Levered Account.

In an alternative embodiment of the invention, the investment structure is structured as a fund of funds, in which multiple classes of investors invest, that in turn invests in multiple investment funds, or a fund that employs alternative investment strategies that overlay the basic trading strategies. In this embodiment, a credit facility is established with the equivalent of three sub-accounts as discussed above.

The present invention offers significant advantages over the structures described above. In particular, the present invention requires a single document, a prime brokerage agreement, rather than the numerous documents that are required in the other structures. This results in a significant reduction in implementation time and lower legal fees. Because this structure does not require the creation of multiple levels of entities, there are reduced administrative and operational expenses. Further, because the leverage provider will have a direct security interest in the General Trading Account, there is greater legal certainty for the leverage provider. Finally, the investment structure allows for multiple classes of leverage for the Levered Accounts, which facilitates management of the account.

DESCRIPTION OF THE DRAWINGS

These and other advantages of the present invention will be readily understood with reference to the following specification and attached drawing wherein.

DETAILED DESCRIPTION

Figure 1:
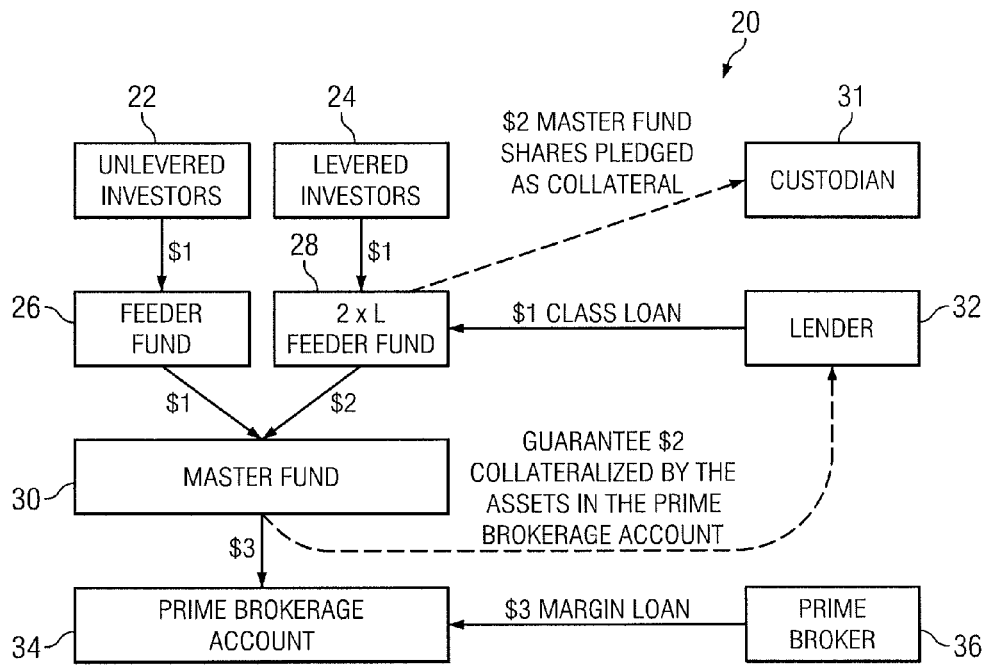
FIG. 1 is block diagram of a prior art master-feeder investment structure with multiple levels of leverage.
Figure 2:
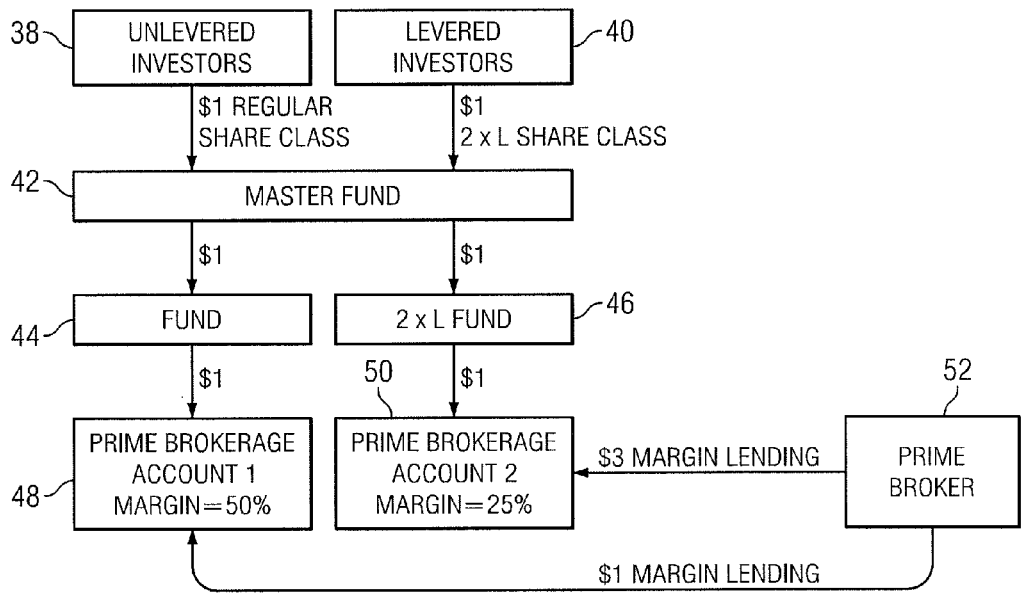
FIG. 2 is block diagram of another prior art investment structure formed as a reverse master feeder configuration with segregated prime brokerage accounts with multiple levels of leverage.

The present invention relates to an investment structure for an investment fund for multiple classes of investors for the purpose of buying, selling and investing in securities, commodities, and/or other investment products. The fund may borrow amounts in the normal course of its investing. Leverage may be used to enable the fund to enhance its returns, but also may result in greater losses, as profits and losses will increase in proportion to the degree of leverage used.

In addition to amounts borrowed at the fund level, the fund will employ a second class of leverage on an investor by investor (or class by class) basis, offering varying amounts of leverage to the different investors or investor classes.

As used herein, investors are classified as either "levered investors" or "unlevered investors." Levered investors are further classified based upon the amount of additional leverage the investor would like the fund to utilize. For example, the fund may be formed with multiple classes of leverage at the investor level, such as 2×, 3×, 4×, etc. Where multiple classes of leverage are provided at the investor level, a separate Levered Account is opened for each leveraged class. Where all investors are leveraged at the class level and there are multiple classes of levered investors, there may be no unlevered investors. In accordance with an important aspect of the invention, leverage at the account level can be actively managed and can be set an any level that is acceptable to the prime broker.

The investment fund in accordance with one embodiment of the present invention is used to open one or more customer accounts with a prime broker (i.e., a prime brokerage account). The prime broker will establish at least three sub-accounts within the prime brokerage account, for example: a General Trading Account, an Unlevered Account and one or more Levered Accounts, in which levered investors may be further classified by the amount of additional leverage utilized and each such classification will result in an additional Levered Account. Alternatively, the prime brokerage account can be established with at least three sub-accounts which include multiple Levered Accounts, no Unlevered Accounts and a General Trading Account. The prime broker will provide margin financing to the fund through advances to the General Trading Account. The prime broker will also provide additional financing through class loans to the Levered Account. This additional leverage may be in the form of additional margin financing, but such additional financing may be secured only by the assets in the Levered Account. The assets of the General Trading Account initially are allocated between the Levered Account and the Unlevered Account and among multiple Levered Accounts as follows:

The Levered Account Pro Rata Percentage for each Levered Account will equal (a) the sum of (i) the aggregate initial capital contributions of the particular class of levered investors, plus (ii) the aggregate amount of any class loans to such Levered Account, divided by (b) the sum of (i) the aggregate initial capital contributions of all investors plus (ii) the aggregate amount of any class loans.

The Unlevered Account Pro Rata Percentage will equal (a) 100% minus (b) the Levered Account Pro Rata Percentage for all Levered Accounts.

The Pro Rata Percentages may be adjusted at any time and from time to time to reflect any profits and losses to the General Account and at any time additional capital contributions are made to the fund or capital contributions are withdrawn from the fund.

On a daily basis or more frequently upon the happening of certain events, such as significant market moves, the prime broker will calculate the value of the assets in the prime brokerage account to determine whether additional margin is required to be contributed to the General Trading Account. If the equity in the General Trading Account is less than the sum of (i) total assets in the account multiplied by the minimum equity requirement as determined by the prime broker's risk and margin policies, plus (ii) the largest amount of any outstanding class loans divided by the Levered Account Pro Rata Percentage of the equity in the account, the prime broker will require the fund to contribute additional capital to or sell securities in the prime brokerage account (a margin call).

If the prime broker makes such a margin call, the margin requirement will be allocated between the Levered Accounts and the Unlevered Account based upon a calculation of the net equity in each account and the Pro Rata Percentage of the net equity in the General Account. If the ratio of equity to total assets in an account is less than the minimum required by the prime broker, that account will be required to post additional equity or sell securities in an amount sufficient to cause the ratio to equal or exceed the minimum required by the prime broker. However, the prime broker will not look to the Unlevered Account to cover any shortfall in the Levered Account(s) or one Levered Account to cover any shortfall in another Levered Account. The foregoing determination as to whether additional margin is required will be made as follows:

First, the prime broker will allocate the total assets in the General Trading Account among the Levered Account(s) and the Unlevered Account (if any) based on the Pro Rata Percentage.

Second, the prime broker will allocate the margin loan among the Levered Account(s) and the Unlevered Account (if any) based on the Pro Rata Percentage.

Third, the prime broker will allocate the class loan to the Levered Account(s).

Fourth, the prime broker will calculate the net equity in each Levered Account(s) as follows: (a).the Levered Account Pro Rata Percentage of such Levered Account multiplied by total assets minus (b) the Levered Account Pro Rata Percentage of such Levered Account multiplied by the margin loan minus (c) the class loan to such Levered Account. The prime broker will then determine the ratio of net equity in the Levered Account to total assets in the Levered Account. If such ratio is less than the minimum required by the prime broker, additional margin will be required.

Fifth, the prime broker will calculate the net equity in the Unlevered Account (if any) as follows: (a) Unlevered Account Pro Rata Percentage of total assets minus (b) Unlevered Account Pro Rata Percentage of the margin loan. The prime broker will then determine the ratio of net equity in the Unlevered Account to total assets in the Unlevered Account. If such ratio is less than the minimum required by the prime broker, additional margin will be required.

Levered and unlevered investors (if any) will participate in returns on the assets in the General Trading Account on the basis of their respective Pro Rata Percentages. As a result, to the extent that any class loans are provided to the Levered Accounts, levered investors will participate in the returns on the General Trading Account as if the levered investors had invested their capital contributions plus any class loans made to that Levered Account, while the unlevered investors will participate in the returns on the General Account on the basis of their capital contributions alone.

Figure 3:
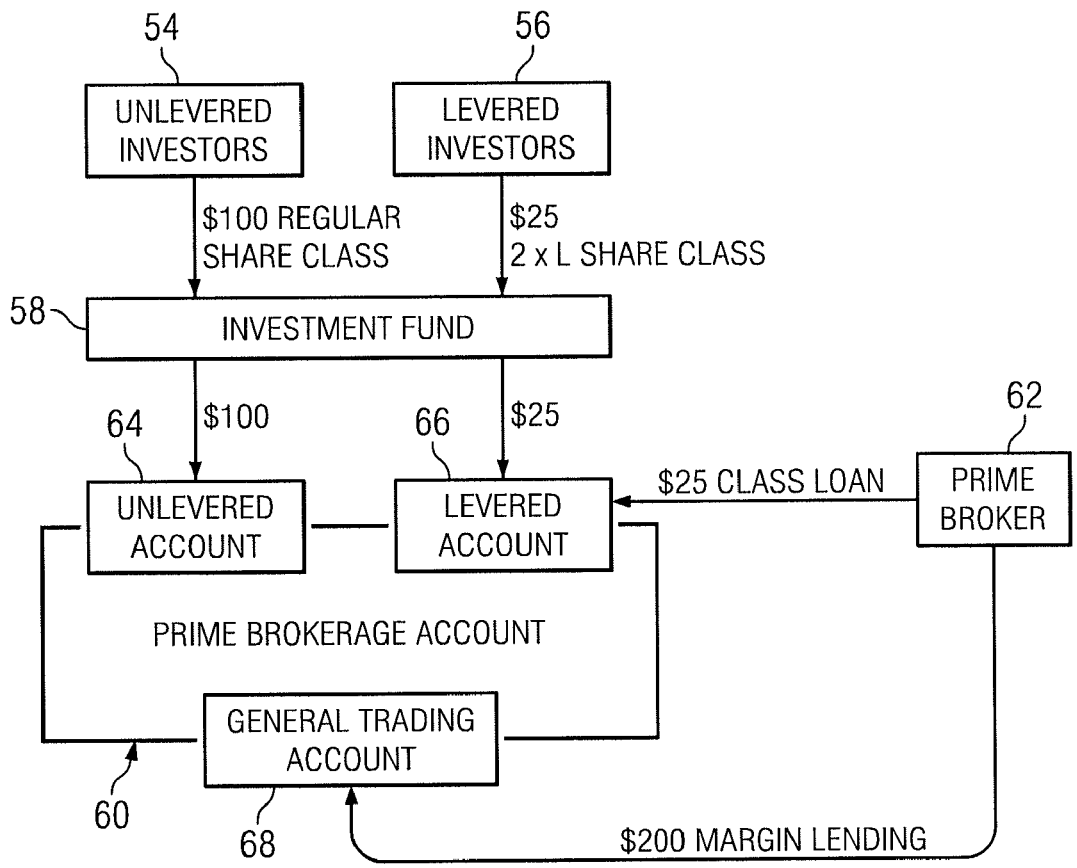
FIG. 3 is a block diagram of an investment structure with multiple levels of leverage in accordance with the present invention.

The prime broker will contractually agree that it (a) will have no recourse against the assets of any account other than the Levered Account to which a class loan was made with respect to an event of default or margin call or the like with respect to the Levered Account or any other obligation solely related to any borrowing on behalf of that Levered Account (a "Levered Account Obligation"); and (b) will have no recourse against the assets of any account other than the Unlevered Account with respect to an event of default or margin call or the like with respect to the Unlevered Account or any other obligation solely related to the unlevered account (an "Unlevered Account Obligation"). The prime broker will solely look to the assets of a Levered Account, including the Levered Account Pro Rata Percentage of the assets of the General Account, to satisfy any Levered Account Obligation applicable to that Levered Account, and the prime broker will solely look to the assets of the Unlevered Account, including the Unlevered Account Pro Rata Percentage of the assets of the General Account, to satisfy any Unlevered Account Obligation A block diagram of the investment structure in accordance with the present invention is illustrated in FIG. 3. As shown, unlevered investors 54 as well as levered investors 56 invest in a common Master Fund 58. This example assumes that there are unlevered investors and a single class of levered investors. The common Master Fund 58 will open a Prime Brokerage Account with a prime broker 62. The Prime Brokerage Account 60 is formed with three sub-accounts: an Unlevered Account 64, a Levered Account 66 and a General Trading Account 68. For purposes of this example, a single Levered Account is shown, although as noted above, the structure could accommodate multiple Levered Accounts, each providing differing levels of leverage. The Prime Broker 62 provides two levels of leverage to the Prime Brokerage Account. First, the Prime Broker 62 provides class loan financing to the Levered Account 66. Second, the Prime Broker 62 provides margin financing to the General Trading Account 68.

In this example, the unlevered investors 54 and the levered investors 56 invest directly into the Master Fund 58. In this example, the levered investor class is assumed to be leveraged at twice the investor's capital contribution. The Master Fund 58 opens a Prime Brokerage Account with three sub-accounts: an Unlevered Account 64, a Levered Account 66 and a General Trading Account 68. The unlevered investors 54 invest $100, all of which is allocated to the Unlevered Account 64. The levered investors 56 invest $25, all of which is allocated to the Levered Account 66. For each dollar allocated to the Levered Account 66, a class loan is obtained from the prime broker for an equal amount, providing a first level of leverage. In this example, a $25 class loan is made to the Levered Account. In addition, a $200 margin loan is provided by the prime broker, providing a second level of leverage. Thus, the General Trading Account is comprised of $100 in unlevered equity, $25 in levered equity, a $25 class loan, and a $200 margin loan, resulting in a total of $350 for investment.

As mentioned above, the levered and unlevered investors share in the returns from the General Trading Account on a pro rata basis. Thus, in this case, the levered investors will share in 1/5 (e.g. [$25+$25]/[$125+$25]) of the returns on the General Trading Account while the unlevered investors would be entitled to 2/3 of the returns on the General Trading Account.

Figure 4:
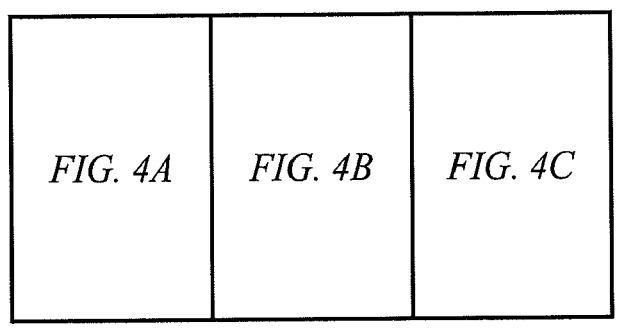
FIG. 4 is an exemplary spread sheet illustrating the operation of the investment structure outlined in FIG. 3.

FIG. 4 is an exemplary spread sheet that illustrates the investment structure in accordance with the present invention. In this example, unlevered investors make a capital contribution to the Master Fund in the amount of $100. Levered investors make a capital contribution to the Master Fund in the amount of $25. The prime broker makes a class loan to the Levered Account of $25 and a margin loan to the General Trading Account of $200. Thus, total assets in the account are $350 and the levered investors' Pro Rata Percentage is 33.33%, while the unlevered investors' Pro Rata Percentage is 66.66%. The initial margin requirement will be the sum of (i) the assets in the account multiplied by the minimum equity requirement (for purposes of this example, $350×10% or $35) plus (ii) the amount of any outstanding class loans divided by the Levered Account Pro Rata Percentage of the equity in the account ($25/33.33% or $75). Thus, the margin requirement will be $110, but the equity in the General Trading Account is $150, so no additional margin is required.

In an exemplary scenario, it is assumed that the master fund then loses 15% in value and its total assets will thus be reduced to $297.50 and the margin requirement will be recalculated. The adjusted margin requirement will be the sum of (i) $297.50×10% or $29.75 plus (ii) $25/33.33% or $75. Thus, the margin requirement will be $104.75. Because the equity in the account is only $97.50, additional margin of $7.25 will be required.

To determine the allocation of the margin call, the prime broker will allocate the total assets in the General Trading Account between the Levered Account and the Unlevered Account based on the Pro Rata Percentage. Thus, the Levered Account will be allocated $99.17 of the total assets and the Unlevered Account will be allocated $198.33. Then the prime broker will allocate the margin loan between the Levered Account and the Unlevered Account based on the Pro Rata Percentage, resulting in an allocation of $66.67 to the Levered Account and $133.33 to the Unlevered Account. The prime broker will then allocate the $25 class loan to the Levered Account.

The net equity in the Levered Account will equal (a) $99.17 minus (b) $66.67 minus (c) $25, or $7.50. The ratio of net equity in the Levered Account to total assets in the Levered Account will equal 7.6% (7.50/99.17). Because such ratio is less than the minimum required by the prime broker, additional margin may be required by the Levered Account.

The net equity in the Unlevered Account will equal (a) $198.33 minus (b) $133.33, or $65.00. The ratio of net equity in the Unlevered Account to the borrowed funds in the Unlevered Account will equal 32.8% (65.00/198.33). If such ratio is less than the minimum required by the prime broker, additional margin will be required.

On a periodic basis, the Pro Rata Percentages will be rebalanced. In this scenario, the 15% loss (i.e., $52.50) in value is allocated 1/3 to the Levered Account and 2/3 to the Unlevered Account. The class loan and the margin loans are reduced accordingly, resulting in equity in the Unlevered Account of $65 [100−(2/3×$52.50)], equity in the Levered Account of $7.50 [25−(1/3×$52.50)], a class loan of $7.50 [25−(1/3×$52.50)], a margin loan of $164.10 [244.10×67.23% (the portfolio loan to value ratio)], and total assets in the General Trading Account of $244.10 [164.10+65.00+7.50+7.50]. The Levered Account Pro Rata Percentage is now 18.75% The margin requirement also will be recalculated.

The adjusted margin requirement will be the sum of (i) $244.10×10% or $24.41 plus (ii) $7.50/18.75% or $40.00. Thus, the margin requirement will be $64.41. Because the equity in the account is $80.00, no additional margin will be required.

In the event of an additional capital contribution to the fund or a redemption of capital from the fund, the Pro Rata Percentages will be recalculated in a similar manner. FIG. 4 illustrates a $4.00 redemption by the Levered Investor. The levered equity is reduced to $3.50, resulting in a reduction in the share loan to $3.50, and a reduction in the margin loan to $147.69 [219.69×67.23%]. The new Pro Rata Percentage is 9.72% [(3.50+3.50)/(65.00+3.50+3.50)], resulting in a reallocation of the margin loan between the Levered Account [$14.36] and the Unlevered Account [$133.33]. The margin requirement goes down from $64.41 to $57.97, while total equity is reduced to $72.00 [65.00+3.50+3.50], so no additional margin is required.

Figure 5:
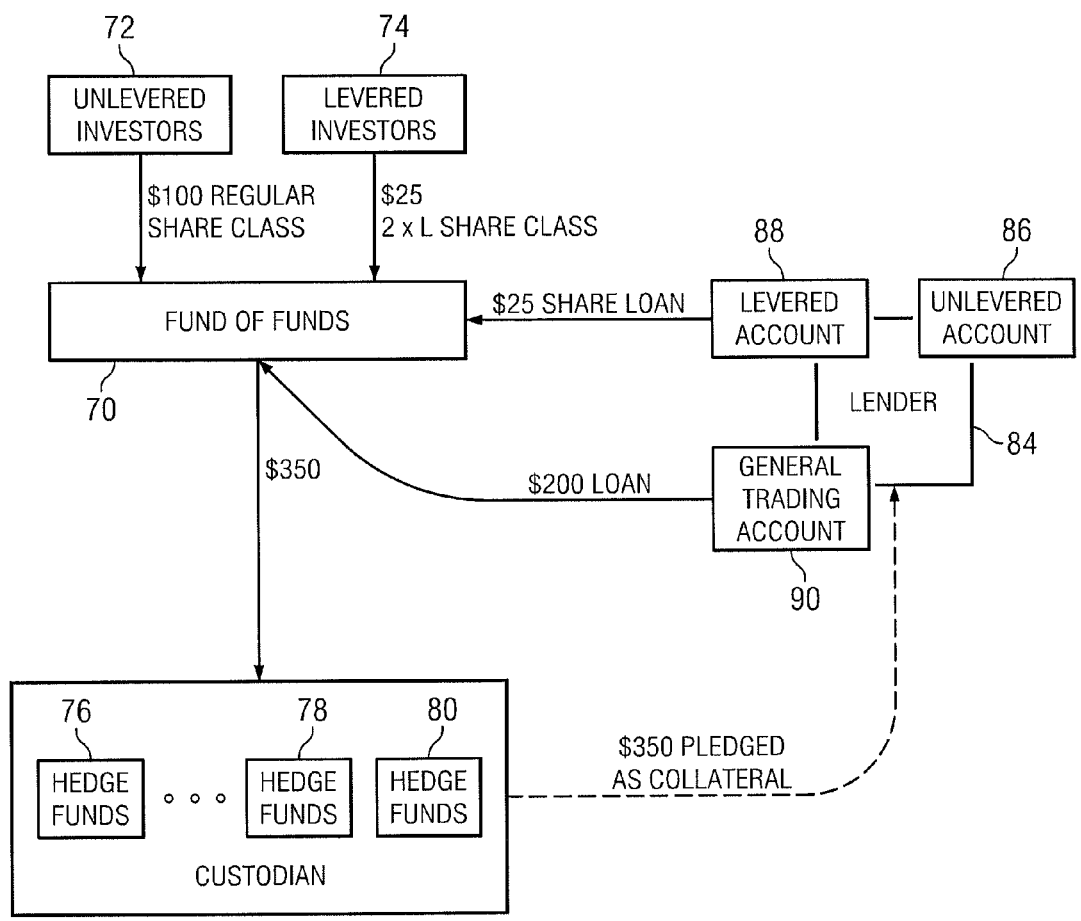
FIG. 5 is a block diagram of an alternative embodiment of an investment structure with multiple levels of leverage in accordance with the present invention.

An alternative investment structure could be utilized in the context of a fund of funds 70, as generally illustrated in FIG. 5. Multiple classes of investors, such as unlevered investors 72 and one or more classes of levered investors 74, may invest in an investment fund or fund of funds 70. The fund of funds 70, in turn, invests in multiple investment funds 76, 78 and 80, rather than directly undertaking trading activity. In this structure, the investment fund 70 establishes a credit facility 82 with a lender 84, rather than opening a prime brokerage account with a prime broker. The credit facility 82 provides for least three sub-accounts, for example: one or more Levered Accounts 86, an Unlevered Account 88 and a General Account 90. In this case, the lender 84 provides class loans to the Levered Account 86 and separate loans to the General Account 90. The General Account 90 will then be used to fund investments in separate investment funds. To the extent class loans are provided to the Levered Account 86, levered investors 74 will participate in the returns on the General Account 90 as if the levered investors 74 contributed capital plus any class loans made to that Levered Account 86. The unlevered investors 72 will participate in the returns on the General Account 90 on the basis of their capital contributions alone. The lender 84 will have no recourse against any assets of any account other than the Levered Account 74 as a result of a default by the Levered Account 74.

Obviously, many modifications and variations of the present invention are possible in light of the above teachings.

Thus, it is understood that within the scope of the appended claims, the invention may be practiced otherwise than specifically described above.

What is claimed is:

1. A method for forming an investment fund, the method comprising steps of, using one or more processors coupled to a non-transitory media:
   (a) forming, using the one or more processors, a fund configured to receive investment capital from at least two classes of investors, wherein the at least two classes of investors include a first levered or unlevered class and a second levered class, and wherein each levered class is defined by a different leverage ratio; and
   (b) opening, using the one or more processors, a prime brokerage account organized under said fund and configured to receive said investment capital from said fund to acquire securities, wherein said prime brokerage account is formed with at least three sub-accounts including a first class account configured to receive contributed capital from the first levered or unlevered class through the fund, a second class account configured to receive contributed capital from the second levered class through the fund, and a general trading account, and wherein said prime brokerage account is configured to receive two levels of leverage from a prime broker in a form of class loans to said second class account as a function of the investment capital invested by the second levered class and of a leverage ratio associated with the second class of levered investors, and in a form of margin loans to said general trading account.

2. The method as recited in claim 1, wherein the first levered or unlevered class is not levered.

3. The method as recited in claim 2, wherein the first class account does not receive a class loan from the prime broker.

4. The method as recited in claim 3, further including configuring said prime brokerage account so that said second class of investors share in returns of the general trading account on a pro rata basis, wherein the returns are determined by including the class loans made to said second class account.

5. The method as recited in claim 4, wherein said fund is formed with a single prime brokerage agreement.

6. The method as recited in claim 1, wherein the first levered or unlevered class is not levered and the first class account is an unlevered account.

7. The method as recited in claim 1, wherein the first levered or unlevered class is levered and the first class account is a levered account.

8. A method for creating a fund with multiple levels of leverage, the method comprising steps of, using one or more processors coupled to a non-transitory media:
   (a) creating, using the one or more processors, a master fund configured to receive investment capital from at least one class of unlevered investors and one class of levered investors; and
   (b) creating, using the one or more processors, a prime brokerage account organized under said fund and configured to acquire securities formed with at least three sub-accounts: an unlevered account configured to receive contributed capital from the class of unlevered investors through the master fund, a levered account configured to receive contributed capital from the class of levered investors through the master fund, and a general trading account, wherein said prime brokerage account is configured to automatically provide a first level of leverage in a form of class loans to said levered account as a function of the investment capital invested by said levered investors and of a leverage ratio associated with the class of levered investors, and wherein said prime brokerage account is further configured to provide a second level of leverage to said general trading account as a function of the contributed capital in said levered account and said unlevered account.

9. The method as recited in claim 8, wherein said master fund is created with a single prime brokerage agreement.

10. The method as recited in claim 9, further including configuring said prime brokerage account so that said class of levered investors share in returns of the general trading account on a pro rata basis, wherein the returns are determined by including said class loans made to said levered account.

11. A method for forming an investment fund comprising steps of, using one or more processors coupled to a non-transitory media:
   (a) establishing, using the one or more processors, a master fund configured to receive investment capital from at least two classes of investors, the at least two classes of investors including a class of unlevered investors and a class of levered investors;
   (b) enabling, using the one or more processors, said master fund to open a prime brokerage account;
   (c) forming, using the one or more processors, said prime brokerage account organized under said fund and configured to acquire securities with at least three sub-accounts: an unlevered account configured to receive contributed capital from the class of unlevered investors through the master fund, a levered account configured to receive contributed capital from the class of levered investors through the master fund, and a general trading account; and
   (d) configuring, using the one or more processors, said prime brokerage account to receive two levels of leverage from a prime broker in a form of class loans to said levered account as a function of the investment capital contributed by the class of levered investors and of a leverage ratio associated with the class of levered investors, and margin loans from said prime broker as a function of a total capital in said general trading account.

12. The method as recited in claim 11, wherein said master fund is established with a single prime brokerage agreement.

* * * * *